US012681554B2

(12) United States Patent
Jen et al.

(10) Patent No.: US 12,681,554 B2
(45) Date of Patent: Jul. 14, 2026

(54) ALTERNATE PHYSICAL LAYER POWER MODE

(71) Applicant: Intel Corporation, Santa Clara, CA (US)

(72) Inventors: Michelle C. Jen, Mountain View, CA (US); David J. Harriman, Portland, OR (US); Zuoguo Wu, San Jose, CA (US); Debendra Das Sharma, Saratoga, CA (US); Noam Dolev Geldbard, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 17/485,371

(22) Filed: Sep. 25, 2021

(65) Prior Publication Data

US 2022/0011849 A1      Jan. 13, 2022

Related U.S. Application Data

(63) Continuation of application No. 16/457,930, filed on Jun. 29, 2019, now abandoned.

(60) Provisional application No. 62/783,550, filed on Dec. 21, 2018.

(51) Int. Cl.
| | |
|---|---|
| *G06F 1/3234* | (2019.01) |
| *G06F 1/3225* | (2019.01) |
| *G06F 3/06* | (2006.01) |

(52) U.S. Cl.
CPC .......... *G06F 1/3275* (2013.01); *G06F 1/3225* (2013.01); *G06F 3/0625* (2013.01); *G06F 3/0659* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 9,946,676 | B2 | 4/2018 | Wagh et al. |
| 10,073,808 | B2 | 9/2018 | Wu et al. |

(Continued)

FOREIGN PATENT DOCUMENTS

| | | |
|---|---|---|
| WO | 2014171937 A1 | 10/2014 |
| WO | 2017052662 A1 | 3/2017 |

OTHER PUBLICATIONS

EPO Extended European Search Report in EP Application Serial No. 19214630.6 mailed on Mar. 9, 2020 (12 pages).

(Continued)

*Primary Examiner* — Paul Yen
(74) *Attorney, Agent, or Firm* — Alliance IP, LLC

(57) ABSTRACT

A device includes physical layer (PHY) circuitry including a physical coding sublayer, where the PHY circuitry is configured to alternatively support at least two different power control settings. The device further includes an interface to couple the PHY circuitry to a media access control (MAC) layer, where the interface comprises a set of data pins, a set of command pins, a set of status pins, one or more clock pins, and a plurality of power control pins to receive an indication of a particular one of the at least two power control settings. The PHY circuitry is to apply parameters corresponding to the particular control setting during operation based on the indication.

22 Claims, 12 Drawing Sheets

(56) References Cited

U.S. PATENT DOCUMENTS

| | | | |
|---|---|---|---|
| 2006/0093028 A1* | 5/2006 | Balan | H04L 25/03343 |
| | | | 375/233 |
| 2009/0164825 A1 | 6/2009 | Sartain | |
| 2010/0159935 A1* | 6/2010 | Cai | H04W 72/082 |
| | | | 455/450 |
| 2010/0325463 A1 | 12/2010 | Lindsay | |
| 2013/0139027 A1 | 5/2013 | Diab et al. | |
| 2013/0265895 A1 | 10/2013 | Diab et al. | |
| 2016/0034025 A1 | 2/2016 | Dabral et al. | |
| 2016/0285624 A1 | 9/2016 | Wagh et al. | |
| 2017/0085862 A1* | 3/2017 | McGarry | H03M 7/3059 |
| 2018/0095923 A1 | 4/2018 | Iyer et al. | |
| 2018/0167891 A1* | 6/2018 | Jiao | H04W 52/0209 |
| 2018/0181525 A1 | 6/2018 | Iyer et al. | |
| 2018/0196710 A1 | 7/2018 | Iyer et al. | |
| 2018/0248650 A1 | 8/2018 | Sharma | |
| 2018/0285298 A1* | 10/2018 | Lillie | G06F 13/20 |
| 2019/0238179 A1 | 8/2019 | Iyer et al. | |

OTHER PUBLICATIONS

EPO; Extended European Search Report issued in EP Patent Application No. 21178943.3, dated Oct. 13, 2021; 17 pages.

Shrivastava, Saurahb et al., "Power Management of PCIe PIPE Interface," Synopsys Corporate Headquarters, Available online at https://blogs.synopsys.com/cip-central/2015/03/03/power-management-of-pipi-interfaceppart-i, Mar. 3, 2015 (17 pages).

* cited by examiner

_Layered Protocol Stack 200_
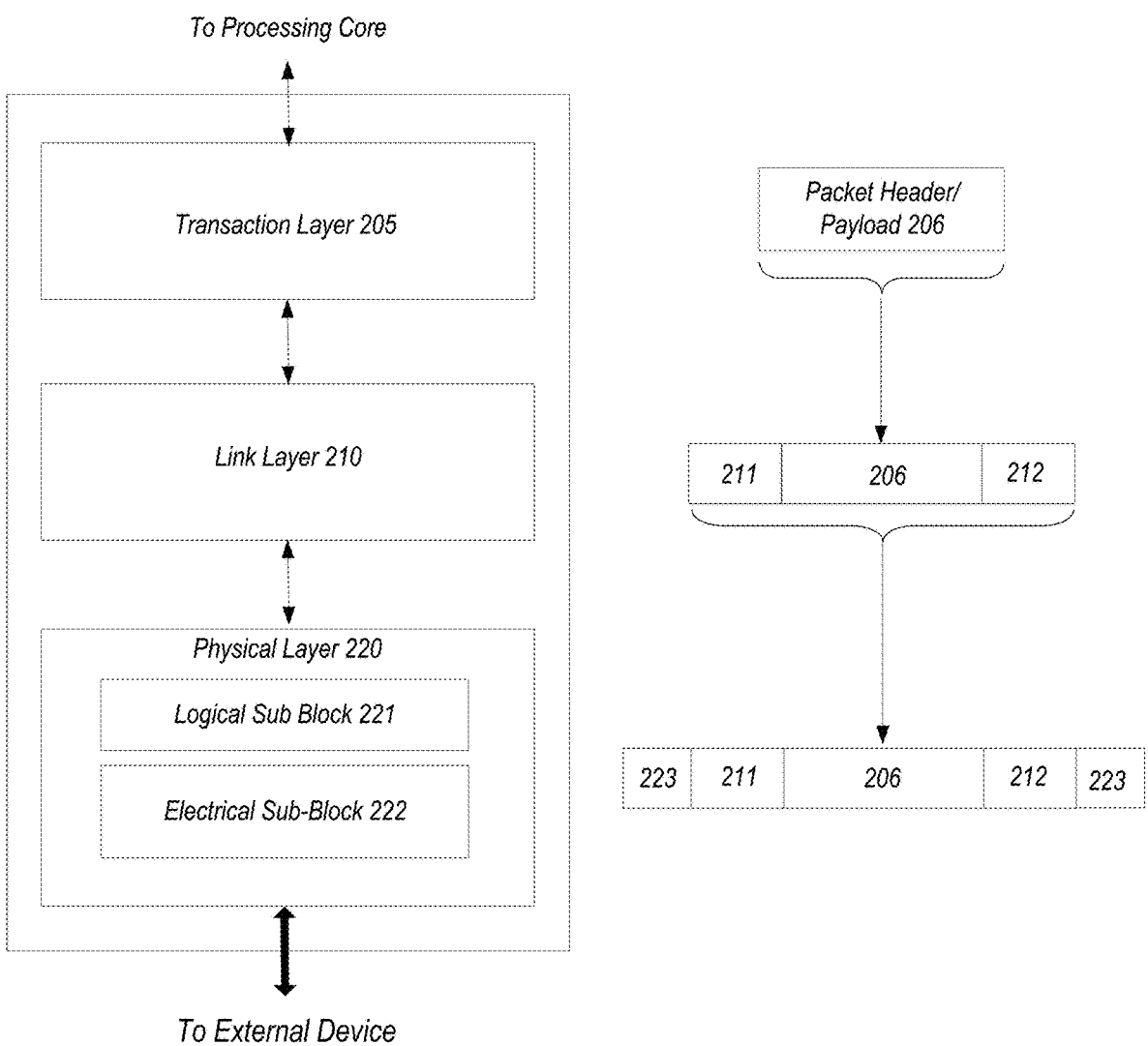
_FIG. 2_

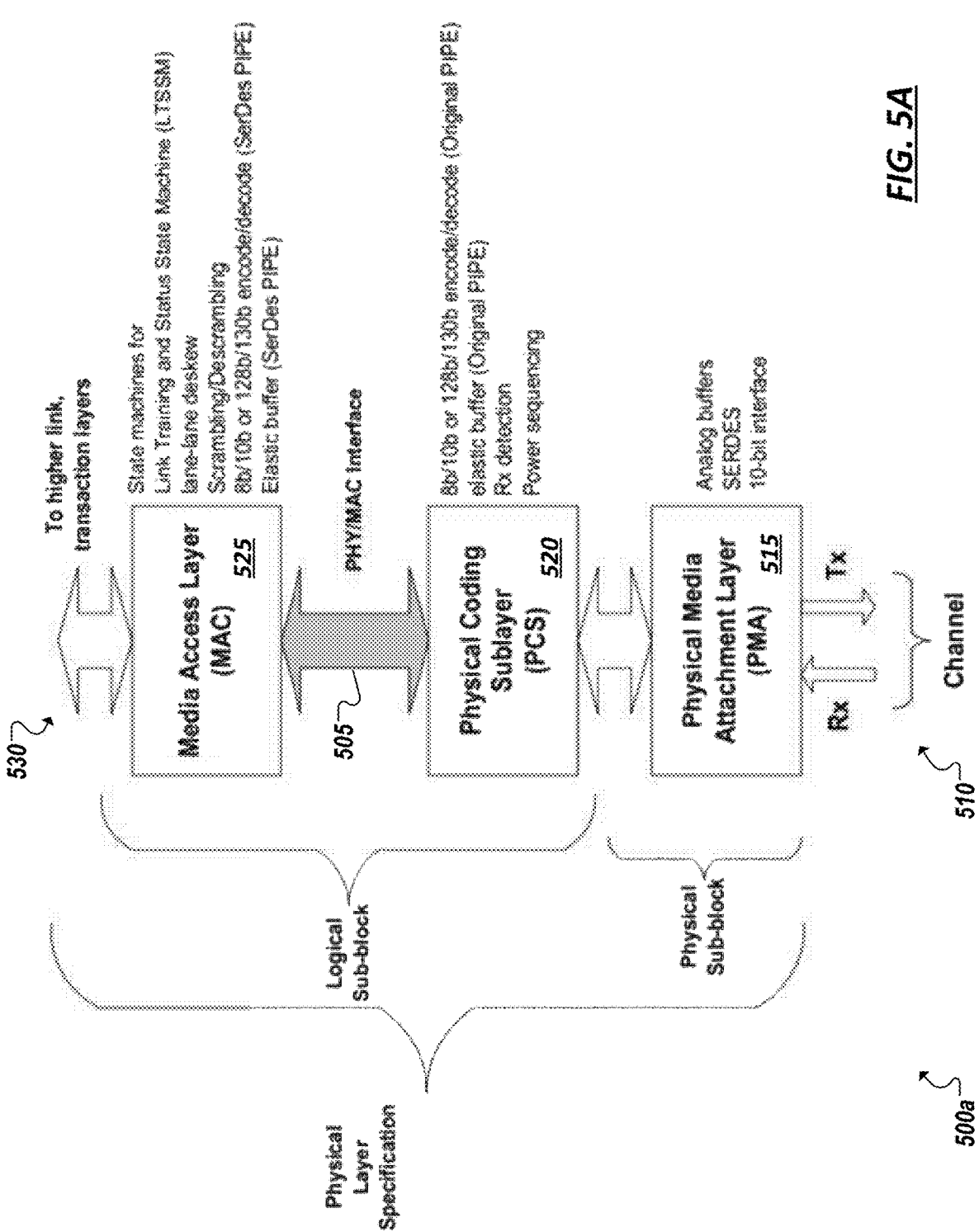

To higher link,
transaction layers

State machines for
Link Training and Status State Machine (LTSSM)
lane-lane deskew
Scrambling/Descrambling
8b/10b or 128b/130b encode/decode (SerDes PIPE)
Elastic buffer (SerDes PIPE)

Media Access Layer
(MAC)    525

PHY/MAC Interface

8b/10b or 128b/130b encode/decode (Original PIPE)
elastic buffer (Original PIPE)
Rx detection
Power sequencing Physical Coding
Sublayer
(PCS)    520

Analog buffers
SERDES
10-bit interface

Physical Media
Attachment Layer
(PMA)    515

Tx

Rx

Channel

530

505

510

Logical
Sub-block

Physical
Sub-block

Physical
Layer
Specification

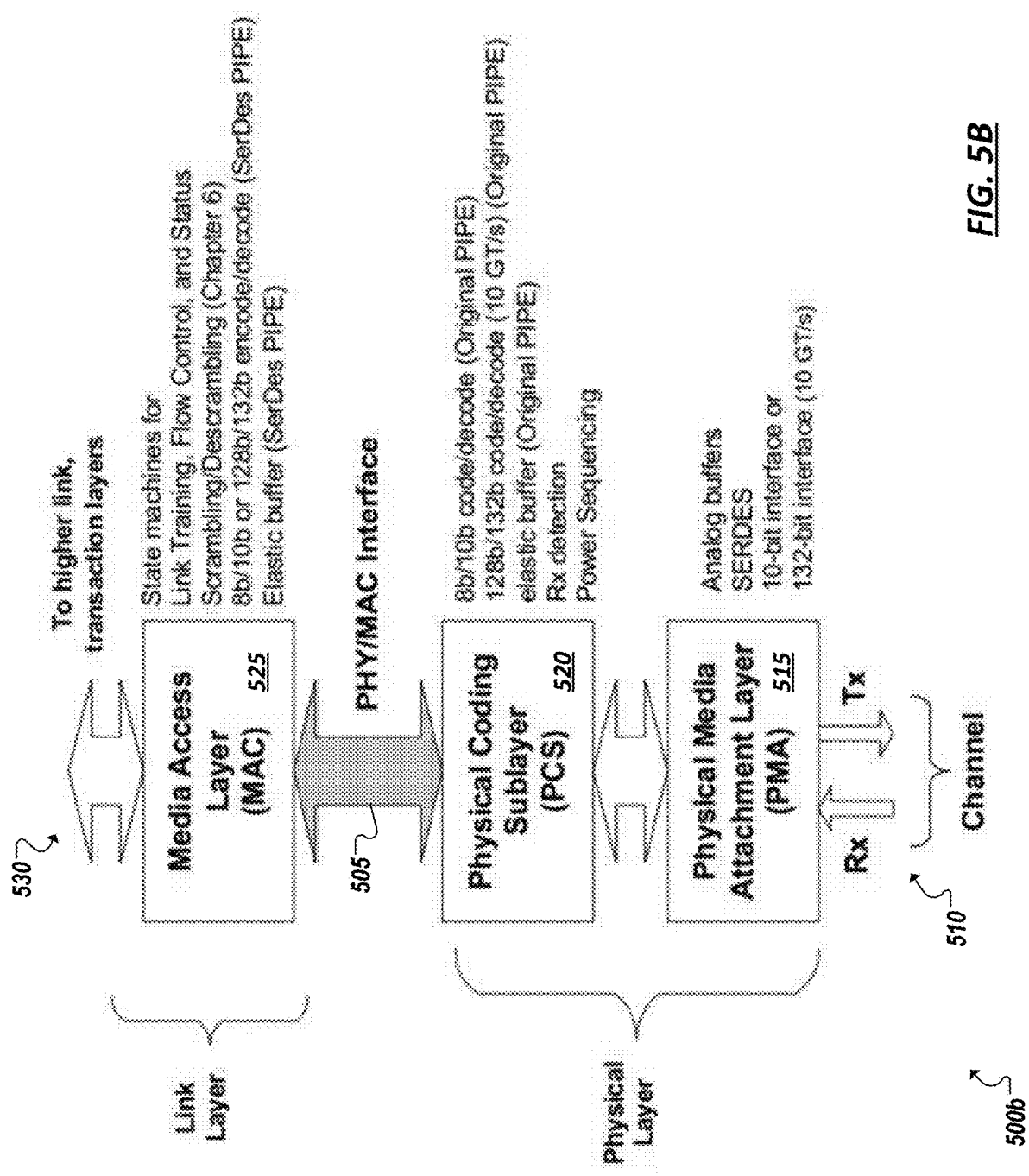

To higher link, transaction layers

State machines for
Link Training, Flow Control, and Status
Scrambling/Descrambling (Chapter 6)
8b/10b or 128b/132b encode/decode (SerDes PIPE)
Elastic buffer (SerDes PIPE)

Media Access Layer (MAC)    525

PHY/MAC Interface

8b/10b code/decode (Original PIPE)
128b/132b code/decode (10 GT/s) (Original PIPE)
elastic buffer (Original PIPE)
Rx detection
Power Sequencing Physical Coding Sublayer (PCS)    520

Analog buffers
SERDES
10-bit interface or
132-bit interface (10 GT/s)

Physical Media Attachment Layer (PMA)    515

Tx

Rx

Channel

Link Layer

Physical Layer

CLK  _840_

PCLK
_835b_

PLL    _905_

Tx Data
_815_
Tx Signals

Tx Block    _910_

Tx+, Tx-
_930_

Command
_825_
Status
_830_

_510_

Rx Data
_820_
Rx Signals

Rx Block
_915_

Rx+, Rx-
_935_

Settings Controller    _920_

Power Ctrl
_805_

Power Mode 1
_925a_

Power Mode n
_925n_

_900_

ALTERNATE PHYSICAL LAYER POWER MODE

CROSS REFERENCE TO RELATED APPLICATIONS

This Application is a continuation (and claims the benefit of priority under 35 U.S.C. § 120) of U.S. application Ser. No. 16/457,930, filed Jun. 29, 2019, and entitled ALTERNATE PHYSICAL LAYER POWER MODE, which application claims benefit to U.S. Provisional Patent Application Ser. No. 62/783,550, filed Dec. 21, 2018. The disclosures of the prior applications are considered part of and are hereby incorporated by reference in their entirety in the disclosure of this application.

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE DRAWINGS

FIG. 2 illustrates an embodiment of a interconnect architecture including a layered stack.

FIGS. 5A-5C illustrate example implementations of a PHY/MAC interface.

DETAILED DESCRIPTION

Figure 1:
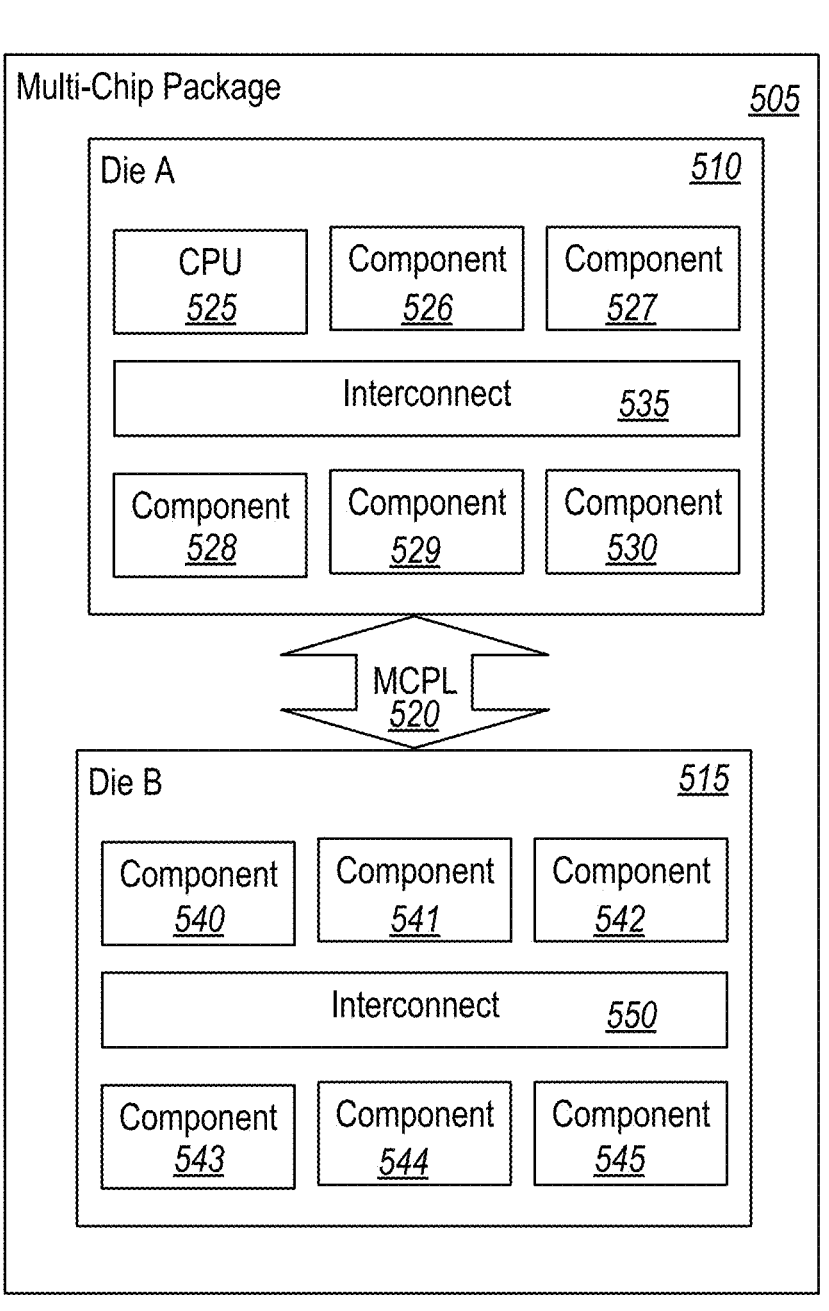
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the subject matter of the present disclosure. In other instances, well known components or methods, such as specific and alternative processor architectures, specific logic circuits/ code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. For instance, such computing platforms, as described herein, may be implemented within servers, data center application, autonomous vehicles, robotics, Internet of Things (IoT) devices, systems on a chip (SOC) devices, embedded applications, set-top boxes, network hubs and switches, smart televisions and appliances, and personal computers (e.g., desktop and laptop computers, smartphones, etc.), among other example applications. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the subject matter described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/ Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
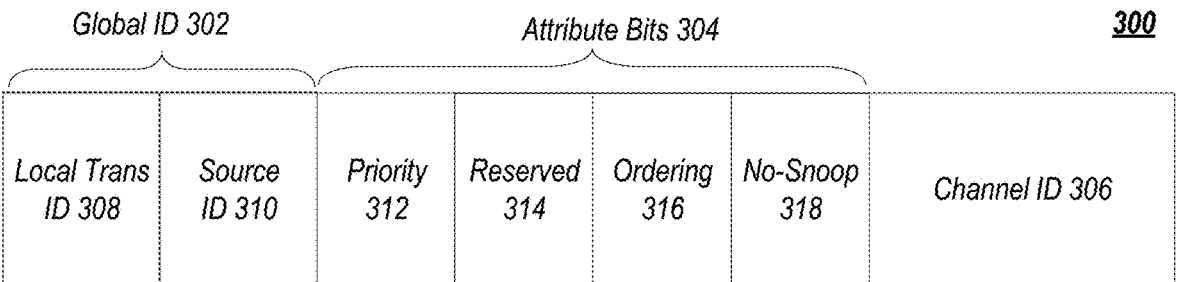
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
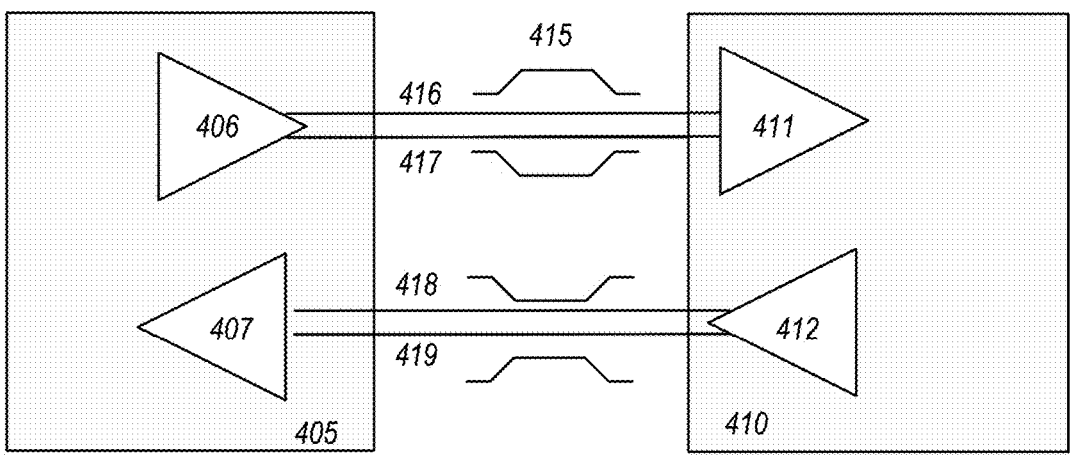
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., DisplayPort) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a data link layer or logical physical layer can include a controller or embody a media access control (MAC) layer. In some implementations, the physical (PHY) layer (e.g., its logic and/or physical fabric) can be provided as a separate intellectual property (IP), or computing, block, which can be coupled with other computing block providing other portions of the hardware logic to implement an interconnect stack. To enable such implementations, an interface can be provided to connect the computing blocks while still supporting a particular interconnect protocol (or potentially multiple different interconnect protocols) over the resulting interconnect (e.g., provided by the interconnected computing blocks). As an example, the PHY Interface for the PCI Express architecture (PIPE) has been developed to define such interfaces. Indeed, PIPE has been extended to enable interfaces between controllers and PHYs in now multiple different interconnect technologies, including not only PCIe, but also SATA, USB, DisplayPort, Thunderbolt, and Converged IO architectures. Accordingly, PIPE is also sometimes referred to, alternatively, as the PHY Interface for PCI Express, SATA, DisplayPort, and Converged IO Architectures. PIPE is intended to enable the development of functionally equivalent PCI Express, SATA and USB PHY's. Accordingly, PHYs can be delivered as discrete integrated chip packages (ICs) or as macrocells for inclusion in ASIC designs or other systems. The specification defines a set of PHY functions which must be incorporated in a PIPE compliant PHY. PIPE is defined to provide a standard interface between such a PHY and a Media Access Layer (MAC) and/or Link Layer ASIC. A standardized PHY interface, such as PIPE, can provide an interface to which ASIC and endpoint device vendors can develop.

Figure 5C:
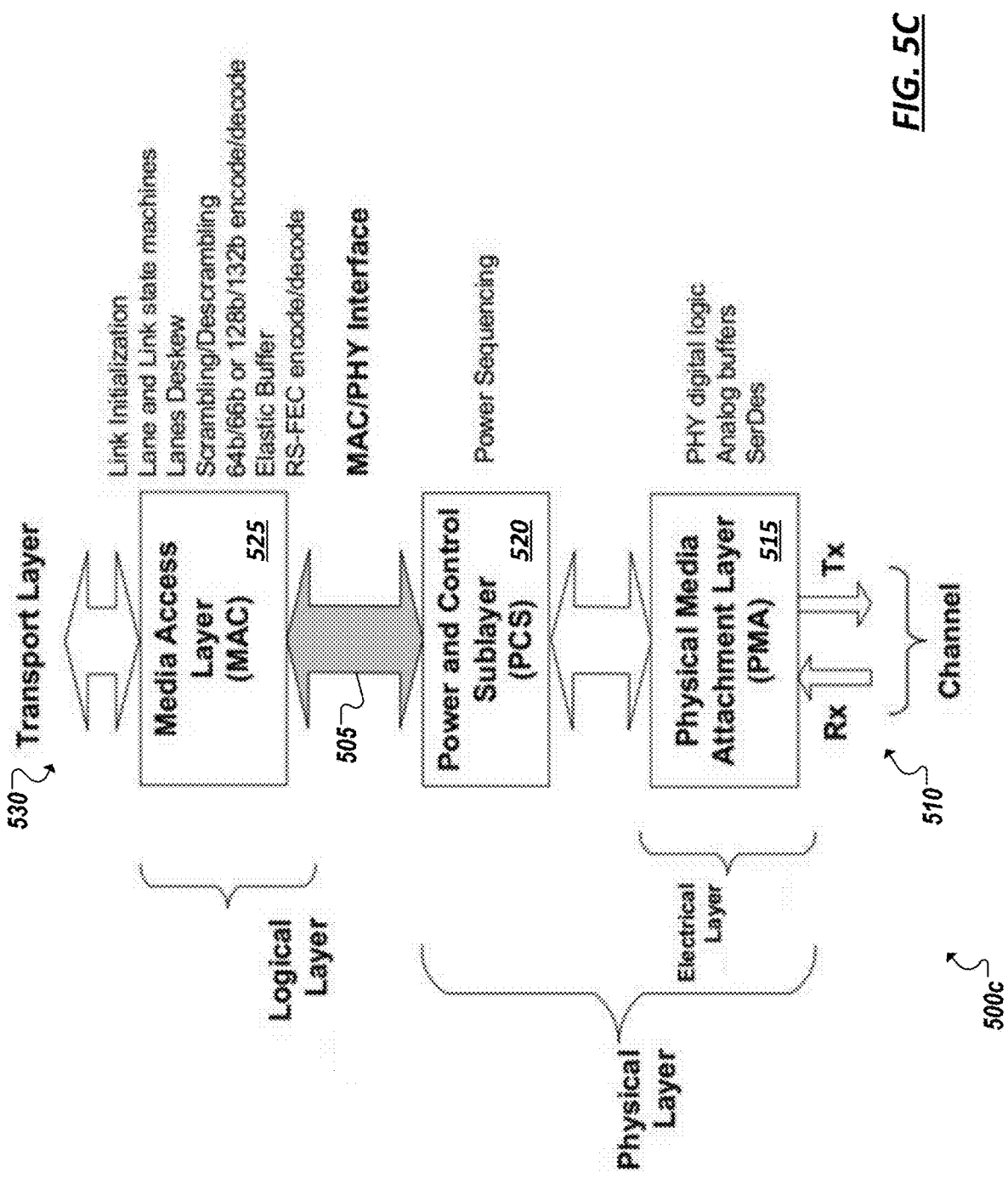

FIGS. 5A-5C are simplified block diagrams 500*a-c* illustrating a defined interface 505 between a PHY and a MAC layer (e.g., implemented as two or more distinct computing blocks (e.g., integrated circuits (ICs), macrocells, intellectual property (IP) blocks, etc.). In some implementations, the interface may be implemented according to a PIPE-based protocol. The interface may assist in defining a partition of the physical layer and other layers of a system according to respective architectures. For instance, FIG. 5A illustrates a partitioning for PCIe using the interface, FIG. 5B illustrates a partitioning for USB using the interface, and FIG. 5C illustrates a partition for Converged IO using the interface, among other examples.

In the examples of FIGS. 5A-5C, data transmitted or received over a physical channel 510 is processed by PHY layer logic. In one example, such as in PCIe architectures (e.g., as illustrated in FIG. 5A), the physical layer may be considered to include both the physical media attachment (PMA) layer 515, the physical coding sublayer (PCS) 520, and the media access layer (MAC) 525. In other examples, such as USB architectures (e.g., as illustrated in FIG. 5B), the physical layer may be defined to include the PMA layer 515 and the PCS 520, with the MAC implementing at least a portion of the link layer of the architecture. In yet another example, such as a Converged IO architecture (e.g., as illustrated in FIG. 5C), the PMA layer 515 and the PCS 520 implement the physical layer, while the MAC implements a logical layer of the architecture, among other example partitioning of layers.

Generally, an example PMA 515 may include analog buffers, a serializer/deserializer (SERDES), an interface (to the channel 510) (e.g., a 10-bit or 130-bit interface), among other example logic and elements. The PCS 520 can include coding/decoding logic (e.g., 8b/10b encode/decode, 64b/66b encode/decode, 128b/130b encode/decode, 128b/132b encode/decode, etc. depending on the architecture), an elastic buffer, and receiver detection logic, among other example logic and elements. In one example, the MAC layer 525 can include state machines for link training, flow control, elastic buffering, lane-to-lane deskew, and status, scrambling and descrambling logic, among other example logic and elements. The MAC layer 525 may provide or enable an interface 530 between the PHY layer (and/or link layer, depending on the architecture) and higher protocol layers of the architecture, such as a data link layer, transaction layer, transport layer, etc.

In some implementations, a PIPE-based PHY/MAC interface 505 may include additional features (e.g., while allowing the interface to be backward compatible with earlier versions of PIPE). For instance, to address the issue of increasing signal count in some implementations, a message bus interface may be adopted in some implementations of the interface 505. The message bus interface maps legacy PIPE signals without critical timing requirements so that their associated functionality can be accessed via the message bus interface (e.g., implemented on control and status pins of the interface) instead of implementing dedicated signals. Additionally, in some instances, to further facilitate the design of generate purpose PHYs implemented as hard IP blocks and to provide the MAC layer with more freedom to do latency optimizations, a SerDes architecture may be provided to simply the PHY and shift further protocol-specific logic into the block implementing the MAC layer, among other example features and enhancements.

Figure 6:
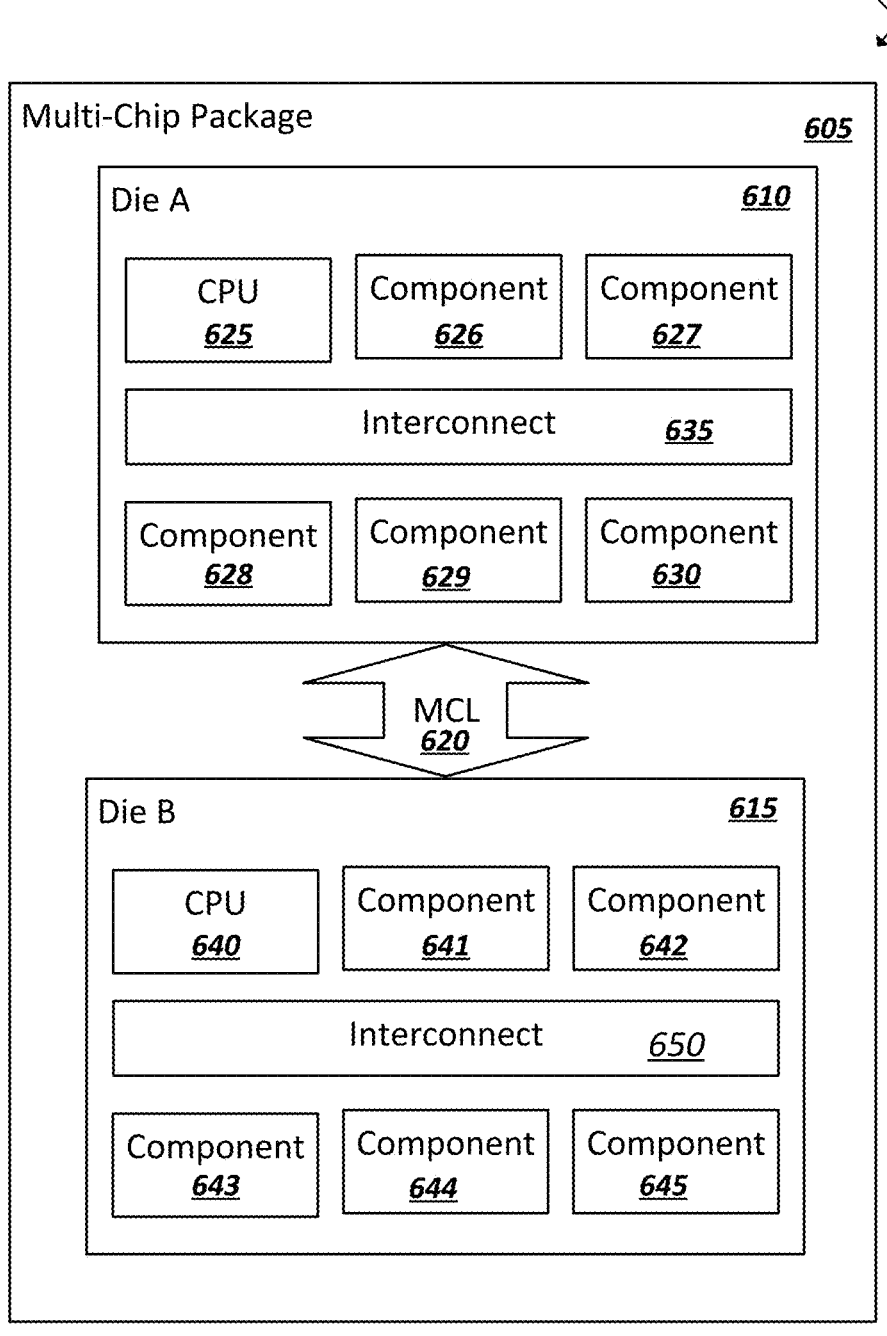
FIG. 6 illustrates an example multi-chip package device.

Turning to FIG. 6, a simplified block diagram 600 is shown illustrating an example multi-chip package (MCP) device 605. The device 605 may be implemented on a single package and include two or more chips, or dies (e.g., 610, 615). Each die may be provided with one or more components, such as processor devices (e.g., CPUs 625, 640), IP block components (e.g., 526-530, 541-545, etc.), and other components. One or more interconnects (e.g., 635, 650) may be provided on each die (e.g., 510, 515) to serve as an on-die interconnect to enable communications between components on the die. In some implementations, a PIPE based interface may be utilized (e.g., such as described herein or using a legacy PIPE interface) to implement at least a portion of the on-die interconnect (e.g., 635, 650), among other example implementations. A die-to-die link (or multi-chip link (MCL)) 620 may be provided to implement a communication line between chips (e.g., 605, 610) on the same package, and may be based on an enhanced implementation of a PIPE-based interface, such as described herein.

Multi-chip packages have become critical to enabling silicon repartitioning for late-binding decisions and for increased density on-package, among other example advantages. A variety of different, competing and proprietary interconnect solutions have been developed (e.g., R-Link, MDFI, HBM2, etc.) for application in MCP devices (e.g., 605) to facilitate both the interconnects (e.g., 620) between chips (or dies) and to interconnect components (e.g., 625-630, 640-645) within the chips (e.g., 610, 615). Each such MCP interconnect option may be each optimized for specific features depending on their applications. However, such variety introduces complexity in design, adoption, and interoperability, leading to a highly fragmented MCP interconnect solution space. In some implementations, these and other additional issues may be addressed through an improved interface definition (e.g., based on a PIPE-based interface) to consolidate the number of distinct MCP interconnect options that are essential for supporting the spectrum of MCP applications, and thereby increase the ease of designing for interoperability by reducing the burden of the number of different interconnects that a design team must support. In some implementations, the ubiquitous nature of PCIe as a chip-to-chip interconnect technology can serve as a foundation for an MCP interconnect that can be widely deployed in a variety of MCP situations, with appropriate strategic optimizations. Specifically, in some implementations, a standardized PIPE interface between the MAC and the PHY may be enhanced to enable short reach PCIe (or links of other interconnect technologies (e.g., USB, SATA, DisplayPort, Thunderbolt, Converged IO, etc.)) by providing hooks to optimize the power and cost to make the application of PIPE-based interfaces more suitable for MCP applications, among other example implementations.

An MCP interconnect solution that enables at least partial consolidation of the MCP interconnect solution space would benefit chipmakers and designers by reducing the burden of the number of interconnects that a design team must support and implement to maintain interoperability, among other example advantages. For instance, a PCIe- or PIPE-based MCP solution enables manufacturers and designers to leverage a known PCIe ecosystem for their MCP solutions and enables deployment of both an on-package (e.g., short reach PCIe) and off-package (e.g., standard PCIe) solution with a single protocol stack IP instantiation (e.g., PCIe IP block), thereby mitigating against additional silicon area being provided to implement the MCP capability (e.g., compared to traditional implementations with dedicated logic blocks to implement both on-package and off-package interconnects). Additionally, through successful consolidation of MCP interconnect solutions (e.g., by specifying power and cost optimization hooks for short reach PCIe in the PIPE specification) may provide incentive for the industry to gravitate toward such a solution and further homogenous and improve interoperability, design overhead, and cost reductions in implementing MCP interconnect solutions, among other example advantages.

Figure 7:
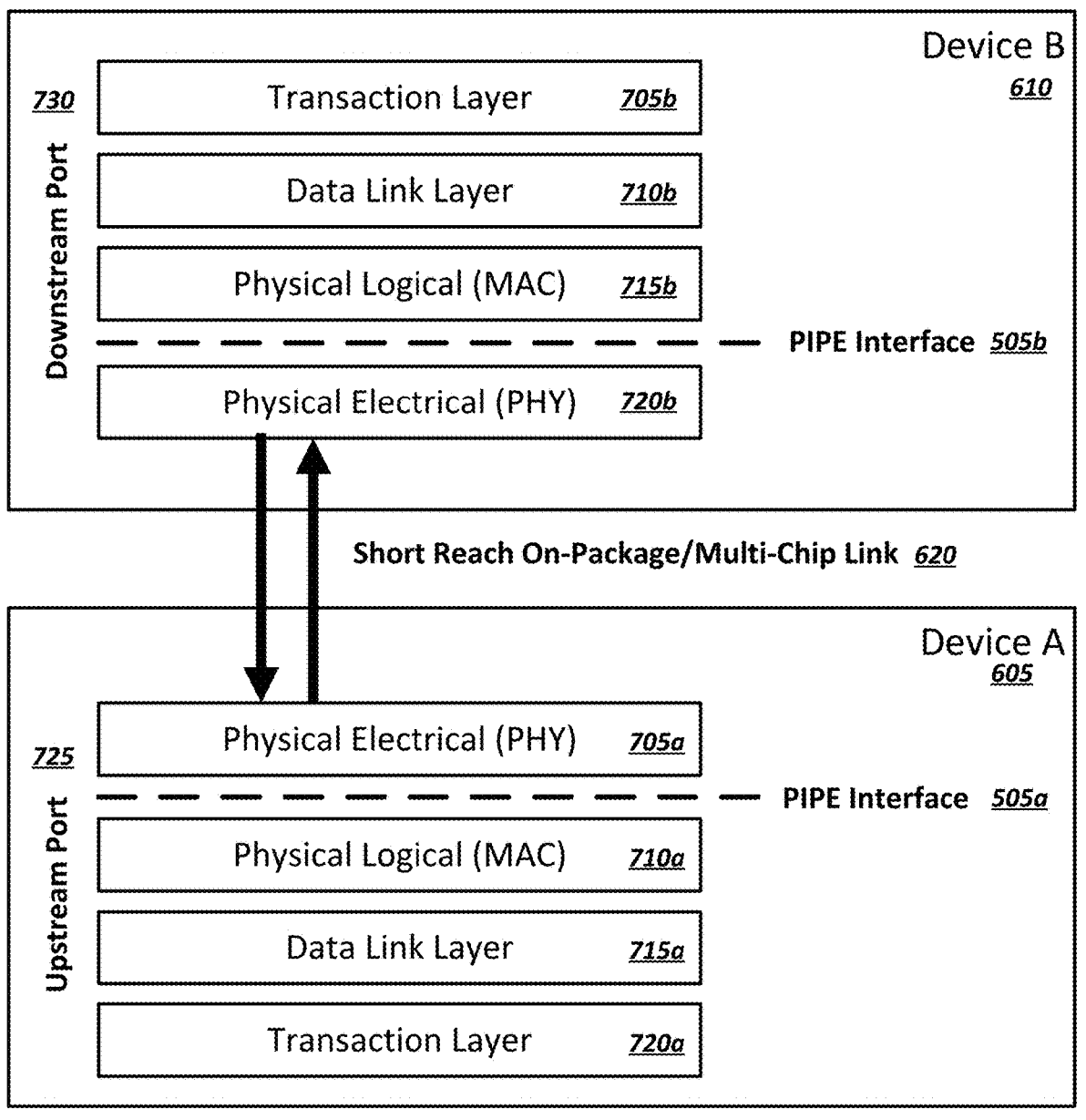
FIG. 7 illustrates an example short reach on-package link between two devices using a PIPE-based PHY/MAC interface.

FIG. 7 is a simplified block diagram 700 showing layers of an example interconnect protocol, such as a PCIe-based protocol, as would be implemented in hardware circuitry, firmware, or other logic of a port of an example chip. A short-reach PCIe link 620 is implemented in this example through upstream and downstream ports of respective chips (e.g., 605, 610) (e.g., on a common package). For instance, respective electrical PHY layers (e.g., 705*a,b*), logical PHY layers (e.g., 710*a,b*), data link layers (e.g., 715*a,b*), and transaction layers (e.g., 720*a,b*) may be implemented at each port 725, 730. Further, in this example, the short reach link 620 may be implemented through the use of PIPE-based interfaces (e.g., 505*a*, 505*b*) at one or both of the ports (e.g., 725, 730) (e.g., where one of the ports could implement a non-PIPE solution and still successfully implement the short reach link). In this example, the MAC layer is implemented at the logical PHY 710*a,b* of each port 725, 730, the electrical PHY layer 705*a,b* serving as the PHY interfacing with the MAC layer over respective PIPE interfaces 505*a,b*. It should be appreciated that other protocols and architectures (e.g., USB, SATA, etc.) may implement the MAC at a different layer of the corresponding protocol. In some implementations, the PHY logic (e.g., 705*a,b*) may be implemented as a separate block of circuitry (e.g., IP block) than the MAC, with the PIPE interface 505*a,b* used for communication between the MAC and the PHY devices or blocks.

In some implementations, a short reach multi-chip link (e.g., 620) may be implemented at least in part through an enhanced PIPE interface (e.g., 505*a,b*). For instance, a block implementing the electrical PHY layer (e.g., 705*a,b*) may be equipped with channel aware logic that can be tuned to optimize power depending on channel characteristics. Through an additional signal provided and defined at the PIPE interface, various power optimizations may be activated (e.g., depending on channel loss) and may include, for instance, reducing transmitter (Tx) swing, reducing receiver (Rx) equalization activity by turning off decision feedback equalization (DFE) and supporting clocks, reducing receiver equalization activity by bypassing some continuous time linear equalization (CTLE) stages and reducing CTLE gain, implementing a more power efficient clock recovery strategy that shares clock data recovery (CDR) circuitry across multiple lanes, modifies link training steps, utilize DC coupling rather than AC coupling, among other example optimizations and combinations thereof. In some implementations, such optimizations, may realize power reductions up to 50%-66% compared to current designs optimized for standard PCIe channels.

As introduced above, an enhanced PIPE-based interface may add a new control signal to the PIPE interface to indicate power optimizations to be adopted by the PHY. A PHY, which is equipped with logic to implement multiple different power profiles or power control settings (e.g., a default setting corresponding to a standard PCIe implementation, and one or more custom, or specialized power profiles (e.g., for short reach multi-chip package link applications)), may read the value at the new power control signal to determine, which of the supported power profiles to implement. In this manner, a system designer may tune the PHY for operation to include various power optimizations (e.g., to realize a reduced power implementation) that are appropriate for the specific channel characteristics.

Figure 8:
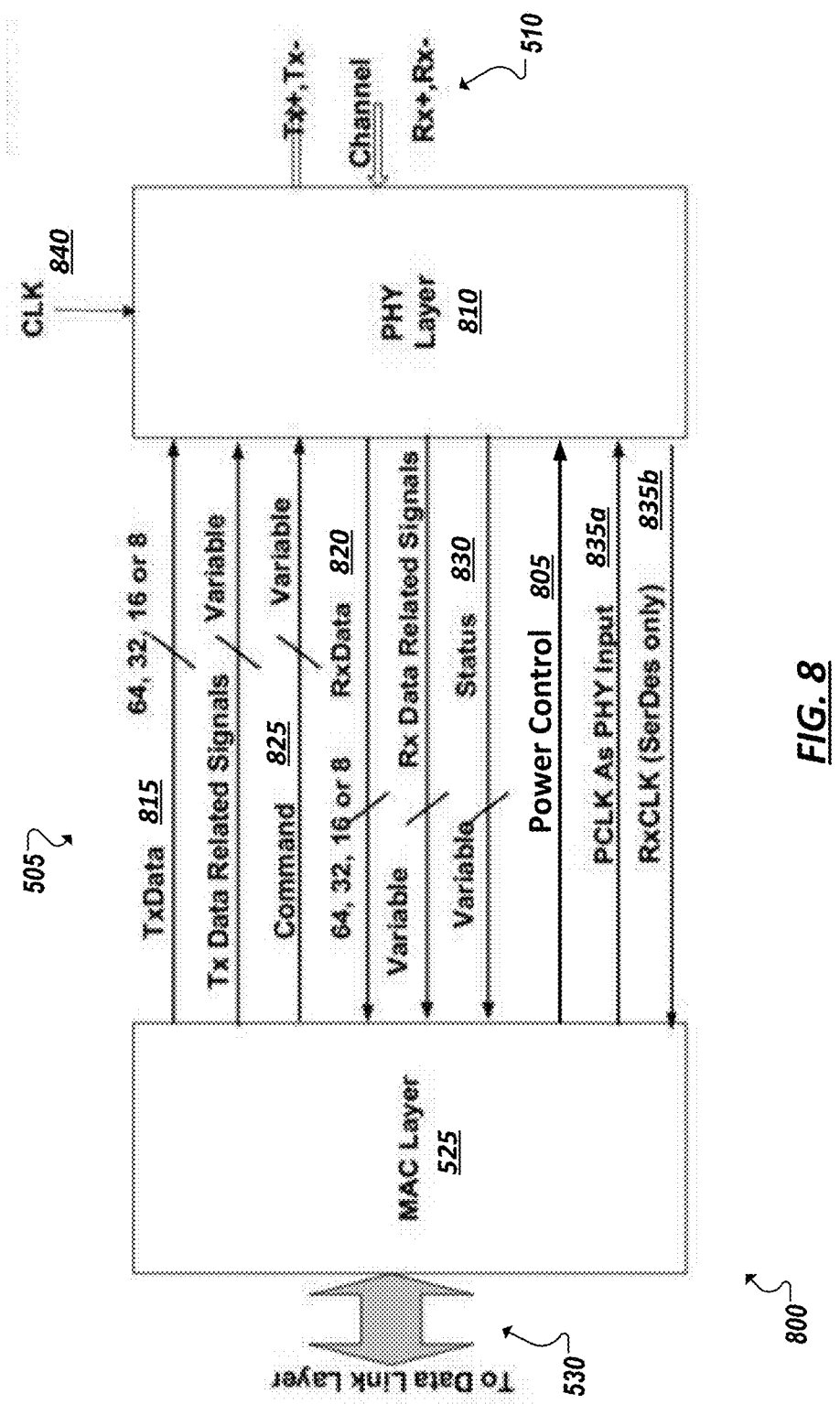
FIG. 8 illustrates a representation of an example PHY/MAC interface with a power control signal.

Turning to FIG. 8, a simplified block diagram 800 is shown illustrating an example PIPE-based interface 505 enhanced to include power control pins to provide a power control signal (e.g., 805) to identify to a PHY block (e.g., 810) one of a set of supported power control settings to be used on a link by the PHY block 810. The power control pins 805 may be provided to supplement the other more conventional signals and pins (and lanes) defined on the PIPE interface 505. For instance, a PIPE interface 505 may include data lanes 815, 820 of various widths (e.g., 8, 16, 32, 64 lanes) in both the transmit (Tx) 815 and receive (Rx) 820 directions. In some instances, the width of the Tx and Rx channels may be asymmetrical or of the same width. In some cases, data-related signals (in either or both the Tx or Rx direction) may be provided. Command and status lanes (e.g., 825, 830) may also be provided (with varying widths). In some implementations, command and status lanes may be used to implement a message bus interface according to a PIPE-based specification. One or more clock pins (e.g., PIPE interface clock (PCLK) pins 835a, receiver clock pins 835b, etc.) may also be provided over which a clock signal (e.g., based on clock input 840) may be sent.

In the example of FIG. 8, the power control lanes 805 may incorporate two or more lanes to enable a binary code of two or more bits to be communicated as the power control signal and identify one of a set of four or more possible power control settings to be selected and applied by the PHY block 810. The mapping of power control settings to the value of the power control signal may be defined specifically for the implementation of the PHY block. In some implementations, the power control setting signal is unidirectional (from the MAC to the PHY), although in other implementations, one or more lanes may be directed from the PHY to the MAC (e.g., to facilitate a particular acknowledgement or handshaking scheme, among other example uses).

Figure 9:
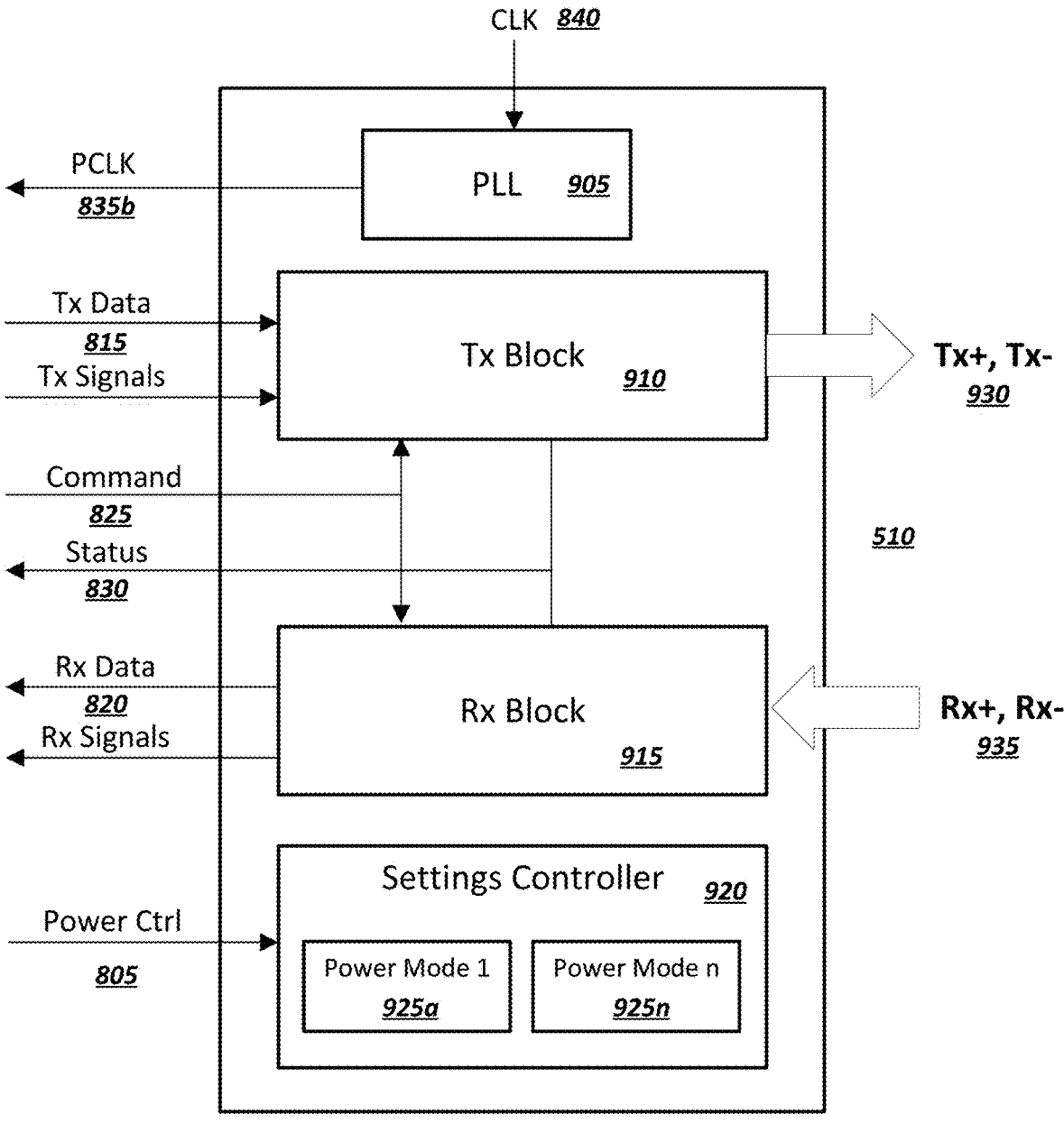
FIG. 9 illustrates an example physical layer block supporting an example PHY/MAC interface with a power control signal.

Turning to FIG. 9, a simplified block diagram 900 is shown of example logical components (e.g., implemented in hardware circuitry, firmware, etc.) of an example PHY block (e.g., a PHY IP block, IC, macrocell, etc.). For instance, the PHY circuitry may include a phase lock loop (PLL) circuitry 905 to generate a clock signal (at PCLK lanes 835a) from a clock input 840. A transmitter (Tx) block 910 may be implemented to receive data (at Tx pins 815) from the MAC layer and prepare the data to be transmitted on the Tx channel 930 of a link (e.g., connecting to another on-package chip). Likewise, the PHY may include a receive (Rx) block 915 to receive data on the Rx channel 935 (e.g., from another chip) and prepare the data to be sent on the PIPE interface to the MAC on Rx lanes 820. Command signals (on command lanes 825) may be sent to either the Tx block 910 or Rx block 915 and status signals may be generated by either the Tx block 910 or Rx block 915 to be sent on status lanes 830.

In some implementations, such as shown in the example of FIG. 9, a PHY block may include a setting controller 920 (e.g., implemented in hardware circuitry logic and/or firmware) to select one of multiple power control settings, or modes, supported by the PHY. As discussed above, the multiple power control settings can include at least one mode that includes changes from default or specification-defined parameters to enable certain power optimizations, such as optimizations for a particular channel length, particular channel loss parameters, or system design. For instance, the PHY block may include logic 925a to implement a first power control setting, which is substantially in compliance with the specification-defined parameters of a particular interconnect protocol (e.g., PCIe). The PHY block may additionally include logic (e.g., 925n) to implement one or more additional, alternative power control settings, which deviate from specification-compliant "default" power control settings or power control settings otherwise considered standard settings for the system (e.g., provided by block 925a), among other examples. For instance, some implementations of a PHY may only provide support for non-specification-compliant power control settings, among other example implementations. The setting controller 920 may read a signal received or provided on power control pins 805 to identify a value mapped to a particular one of other power control settings supported by the PHY block (e.g., through logic 925a-n). In some cases, the power control signal may be generated and sent on the power control lanes 805 of the enhanced PIPE-base interface by the MAC. In other cases, a system designer may tie or fuse the power control pins 805 to a permanent value to statically indicate a particular one of the power control settings to the PHY block. In either case, the settings controller 920 may read the value at the power control pins 805 and enable a corresponding one of the power control setting logic blocks (e.g., 925a-n) to cause the PHY block to adopt functionality in compliance with the select power control setting, among other examples.

Table 1 illustrates a definition of a new power control signal to be added to a PIPE-based interface. For instance, the signal may be a two-bit power control signal (e.g., designated multi-chip power control ("MCPPowerControl [1:0]") or short channel power control ("ShortChannelPowerControl[1:0]"), among other examples. In some implementations, a PHY block that supports multiple different power control settings and is further compatible with the new power control signal may be provided with corresponding power control pins and implement this signal with at least two supported values and corresponding settings, such as PowerControlSetting0 and PowerControlSetting1. For instance, PowerControlSetting0 may be mapped to a standard, default power control setting with normal operational behavior for standard PCIe channels, while other power control settings (e.g., PowerControlSetting1) are power control settings with different power parameters optimized for a particular application, such as short channel, multi-chip package link applications and other example applications. In some implementations, a PIPE interface supporting the power control signal may assume that all PHY blocks configured to accept the power control signal will always define and support at least one non-standard power optimized setting and optionally more than one non-standard setting. This type of control for tuning the power settings provides flexibility for PHY vendors to determine the best optimizations that are applicable to their particular I/O design.

TABLE 1

| Additional PIPE Interface Signal to Enable Alternative PHY Power Modes | | |
| --- | --- | --- |
| PIPE Signal | Direction | Description |
| ShortChannelPowerControl[1:0] | Input to PHY | This signal is optionally supported by PCIe PHYs to enable multi-chip package solutions that can be optimized for power due to shorter channel reach. This signal should be stable before Reset# is deasserted and should not change value until the next Reset# assertion. Possible settings are as follows (details of |

TABLE 1-continued

| Additional PIPE Interface Signal to Enable Alternative PHY Power Modes | | |
|---|---|---|
| PIPE Signal | Direction | Description |
| | | optimizations associated with each setting are described in the PHY datasheet per the PHY parameter 'ShortChannelPowerControlSettingsSupported'): 'PowerControlSetting0' (00b) - Normal baseline operation for standard PCIe channels 'PowerControlSetting1' (01b) - Most aggressive power optimized setting for MCP; this setting is required to be supported if ShortChannelPowerControl[1:0] is implemented 'PowerControlSetting2' (10b) - Optionally supported if ShortChannelPowerControl[1:0] is implemented 'PowerControlSetting3' (11b) - Optionally supported if ShortChannelPowerControl[1:0] is implemented |

In some cases, a PHY vendor may generate and provide information (e.g., in product documentation, a capability register, through a cloud-based database, etc.) that specifies the alternative power control settings supported by the corresponding PHY block, as well as define a mapping of power control signal (e.g., binary) values to each of the supported power control settings and articular which power optimizations are associated with and the be implemented through each of the supported power control settings. As an examples, a PHY block, which supports PCIe MCP usages via an example power control signal may advertise in a corresponding datasheet the power control settings it supports and which power optimizations are associated with each supported setting. For instance, Table 2 provides details of a new PHY parameter that PHY vendors may publish in their datasheet to advertise and thereby enable use of the new PIPE control signal for their respective PHY device.

TABLE 2

| PHY Parameter to Enable Alternative PHY Power Modes | |
|---|---|
| PHY Parameter | Description |
| Short Channel Power Control Settings Supported | The PHY lists each power control setting it supports via the ShortChannelPowerControl[1:0] signal. For each supported power control setting, the PHY provides details of the optimizations to reduce power which may include (but are not limited to) the following: Channel loss assumed (e.g. 5dB, 10dB, 15dB, 25dB) DFE receiver equalization factor (e.g. turning off DFE taps and supporting clocks) Bypassing CTLE stages or reducing CTLE gain Clock recovery strategy with shared CDR The PHY datasheet should specify details of supported states in the following table: |

| Power Control Setting | Description | pJ/bit | Optimizations |
|---|---|---|---|
| 00b (PowerControlSetting0) | Normal Operation | Vendor specified | N/A |
| 01b (PowerControlSetting1) | Proposed mode: Most power optimized setting for <=5 dB channel and half swing transmitter | Vendor specified | Vendor defined |

TABLE 2-continued

| PHY Parameter to Enable Alternative PHY Power Modes | | | |
| --- | --- | --- | --- |
| PHY Parameter | Description | | |
| 10b (PowerControlSetting2) | Proposed mode: Most power optimized setting for <=10 dB channel and half swing transmitter | Vendor specified | Vendor defined |
| 11b (PowerControlSetting3) | Vendor defined | Vendor specified | Vendor defined |

As discussed above, a variety of power optimizations and changes may be adopted in the power control settings supported within a particular PHY block supporting use of an example PIPE power control signal. For instance, such optimizations may include channel loss (e.g., 5 dB, 10 dB, 15 dB, 25 dB), DFE receiver equalization activity factor (e.g. completely turned off or reduced DFE taps), whether CTLE is turned on or off, bypassing CTLE stages or reducing CTLE gain, whether clock recovery is shared or per lane, among other examples. For instance, power optimizations may specify (or be assumed to incorporate) DC coupling (e.g., rather than AC coupling) assuming the elimination of capacitors used in AC coupling given a short channel length and/or a desire to realize cost savings by eliminating such capacitors. In some instance, as part of DC coupling support, the PCIe Physical layer should bypass explicit receiver detection when operating in an MCP optimized mode per the MCPPowerControl[1:0] signal. In some instances, changes to the link training state machine (e.g., a PCIe Link Training and Status State Machine (LTSSM)) may be supported in connection with an alternative PHY power control setting. For instance, the receiver detection (Rx Detect) operation described in the PCIe specification in the PCIe LTSSM Detect.Active state may be bypassed (e.g., based on DC coupling provided in the alternative power control setting) and the LTSSM automatically proceed to Polling. If the LTSSM transitions back to Detect from Polling due to timeout conditions specified in the PCIe specification, a subsequent transition from Detect to Polling should occur when an electrical idle exit condition is detected or after a reasonable timeout period (e.g. 30 or 100 ms) Further optimization based on DC coupling can be implemented to reduce power state (e.g., PCIe L1.2) exit latencies, among other example changes.

In some implementations, in applications utilizing an alternative power control setting (e.g., a short reach application, such as a multi-chip package link application), a provision may be defined and supported by the system to revert the power control signal (e.g., ShortChannelPowerControl[1:0]) to a normal operation mode for situations where one or more optimized power parameters of an alternative power control setting prevents link up. For example, if a particular setting is not compatible with a 2.5 GT/s link speed and works only at higher link speeds, the system (e.g., through the MAC or system software) may automatically set the power control signal back to a value to indicate a normal or default power control setting, bringing the PHY block (at least temporarily) into a normal operation mode to allow the link to be brought up initially before changing the value back to an optimized power control setting while transitioning to higher link speeds. In some cases, such difficulties in performing a link up using an alternative power setting may be predicted to cause the MAC to dynamically and strategically signal, on the power control pins, that the PHY adopt the default power control setting during initial link up, and then opportunistically changing the power control signal after link up to cause the PHY to switch to the optimized, alternative power control setting, among other examples. Indeed, while in some cases, it may be unlikely that power control settings will change during operation (and the MAC may only signal a single value statically on the power control pins), other MAC implementations and application may involve more dynamic management and switching of power control settings provided by an example PHY block using the new PIPE power control signal.

The foregoing disclosure has presented a number of example implementations and features. It should be appreciated that other embodiments may be provided in addition to those identified above without departing from the more generalized principles contained within this disclosure. For instance, while some of the example state machines and ordered sequences discussed herein were described with reference to various specific protocols (e.g., PCIe, SATA, USB, etc.), it should be appreciated that similar, corresponding enhancements may be made to other interconnect protocols and MAC-PHY interfaces based on these other interconnect protocols such as OpenCAPI™, Gen-Z™, UPI, NVLink™, Cache Coherent Interconnect for Accelerators (CCIX™), Advanced Micro Device™'s (AMD™) Infinity™, Common Communication Interface (CCI), or Qualcomm™'s Centrig™ interconnect, among others.

Note that the apparatus', methods', and systems described above may be implemented in any electronic device or system as aforementioned. As specific illustrations, the figures below provide exemplary systems for utilizing the implementations and features described herein. As the systems below are described in more detail, a number of different interconnects are disclosed, described, and revisited from the discussion above. And as is readily apparent, the advances described above may be applied to any of those interconnects, fabrics, or architectures.

Figure 10:
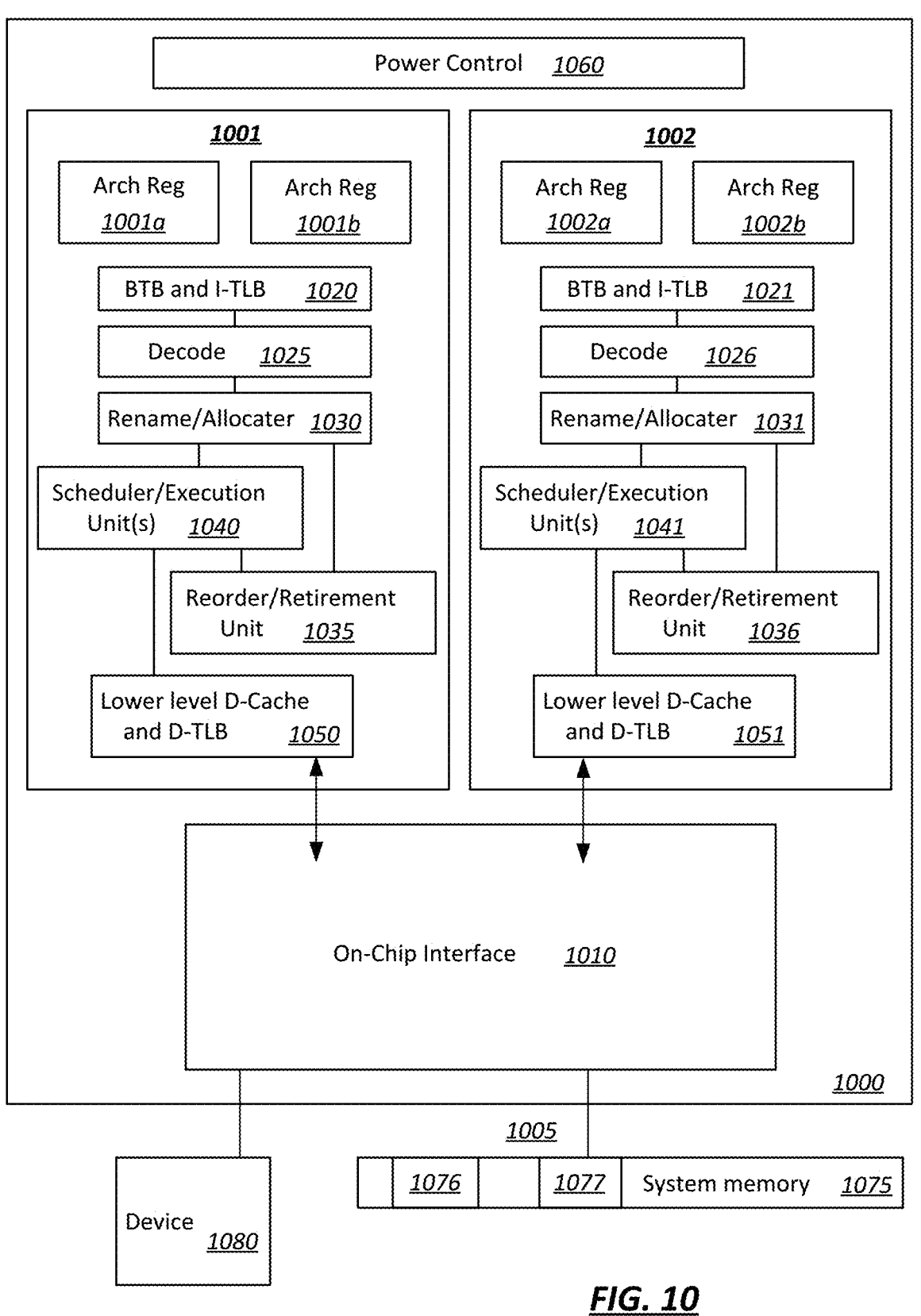
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1301a, 1001b, 1002a, and

1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices (e.g., 1080) external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus. Interconnects utilized to couple to and communicate with such devices (e.g., 1080) may utilize PIPE-based interfaces such as discussed herein.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, device 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
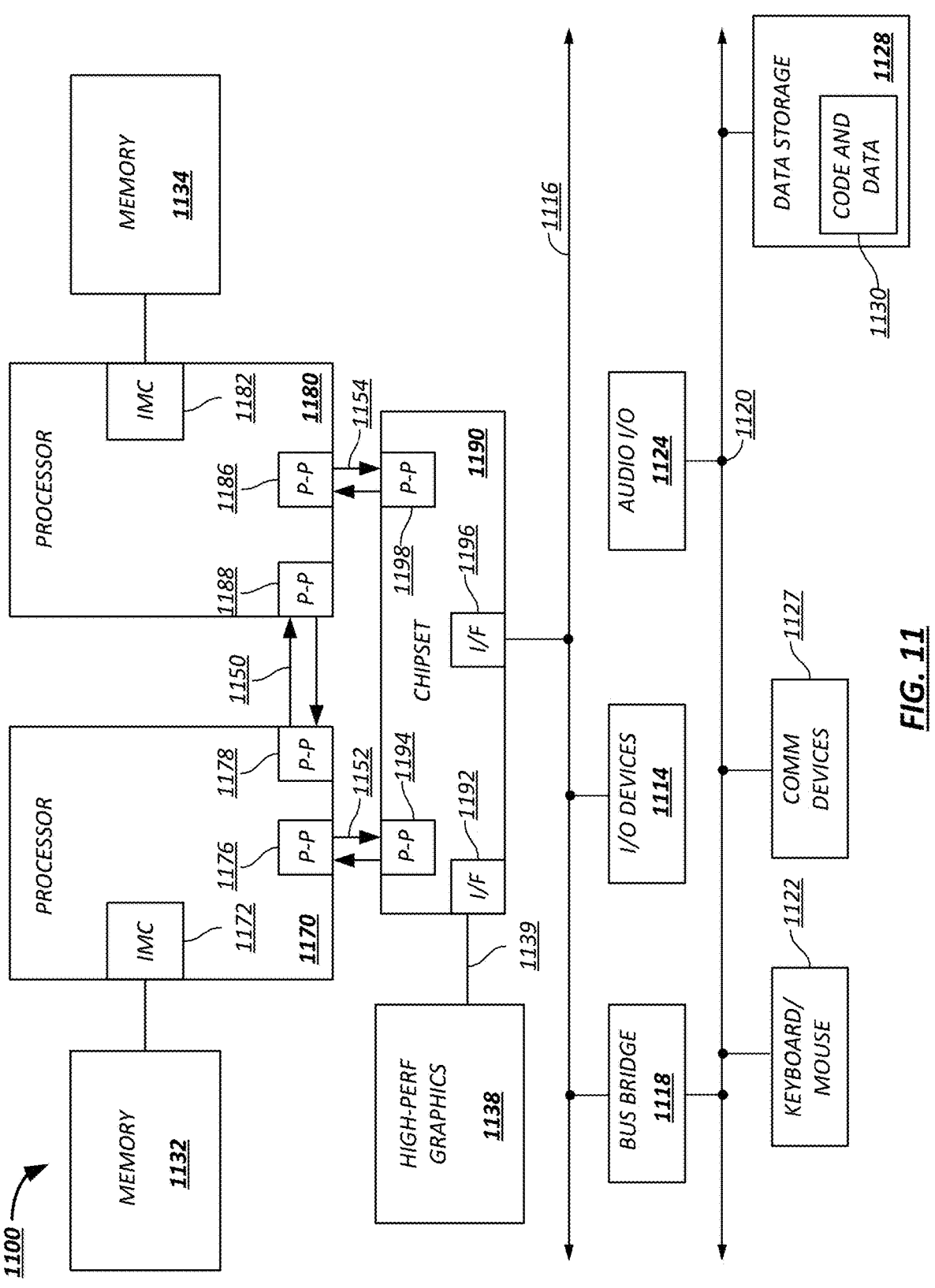
FIG. 11 illustrates an embodiment of a block for a computing system including multiple processors.

Referring now to FIG. 11, shown is a block diagram of another system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: physical layer (PHY) circuitry including a physical coding sublayer, where the PHY circuitry is configured to alternatively support at least two different power control settings; and a PHY Interface for the PCI Express (PIPE)-based interface to couple the PHY circuitry to a media access control (MAC) layer, where the interface includes a set of data pins, a set of command pins, a set of status pins, and a plurality of power control pins to receive an indication of a particular one of the at least two power control settings, where the PHY circuitry is to apply parameters corresponding to the particular control setting during operation based on the indication.

Example 2 includes the subject matter of example 1, where the indication includes values permanently set at the plurality of power control pins, and the values include a code to identify the particular power control setting.

Example 3 includes the subject matter of any one of examples 1-2, where the indication includes at least one signal sent from the MAC layer on the plurality of power control pins, and the signal specifies a binary value including two or more bits to identify the particular power control setting.

Example 4 includes the subject matter of any one of examples 1-3, where the at least two power control settings include a standard power control setting and an alternative power control setting.

Example 5 includes the subject matter of example 4, where the alternative power control setting includes a power control setting associated with channels with short physical lengths.

Example 6 includes the subject matter of any one of examples 4-5, where the at least two power control settings include a plurality of alternative power control settings.

Example 7 includes the subject matter of any one of examples 4-6, where the alternative power control setting corresponds to implementation of the physical layer in a multi-chip package.

Example 8 includes the subject matter of any one of examples 4-7, where alternating current (AC) coupling is to be used in the standard power control setting and direct current (DC) coupling is to be used in the alternative power control setting.

Example 9 includes the subject matter of any one of examples 1-8, further including a PHY integrated circuit (IC) device including the PHY circuitry and the interface, where the PHY IC device is discrete from the MAC layer.

Example 10 includes the subject matter of any one of examples 1-9, further including a microcell including the PHY circuitry and the interface.

Example 11 includes the subject matter of any one of examples 1-10, where the parameters include one or more of a transmitter swing parameter, a receiver equalization parameter, a clock recovery parameter, and a link training state machine parameter.

Example 12 is an apparatus including: a media access control (MAC) layer block including: state machine logic to implement a link training and status state machine of a particular interconnect protocol; and circuitry to generate signals according to the particular interconnect protocol; and a PHY Interface for the PCI Express (PIPE)-based interface to couple to a physical layer device to implement at least a physical coding sublayer of a physical layer, where the interface includes a set of data pins, a set of command pins, a set of status pins, and a plurality of power control pins to indicate a particular one of at least two power control settings to be implemented on the physical layer device, where the circuitry is further to generate a value at the power control pins to indicate the particular power control setting to the physical layer device and the particular power control setting includes settings for a short-reach link.

Example 13 includes the subject matter of example 12, where the particular interconnect protocol includes one of a protocol based on PCIe, USB, SATA, Display Port, Thunderbolt, or Converged IO.

Example 14 includes the subject matter of any one of examples 12-13, further including a power setting detector to determine that the particular power setting is to be applied and cause the particular power setting to be indicated at the power control pins of the interface.

Example 15 includes the subject matter of any one of examples 12-14, further including a multi-chip package including the MAC layer block and the physical layer device, where the physical layer device is to interconnect at least a portion of devices in the multi-chip package, and the particular power control setting is to be indicated based on inclusion of the physical layer device in the multi-chip package.

Example 16 includes the subject matter of any one of examples 12-15, where the short reach link is to couple devices in a multi-chip package.

Example 17 includes the subject matter of any one of examples 12-16, where the at least two power control settings include a standard power control setting and an alternative power setting.

Example 18 includes the subject matter of example 16, where the at least two power control settings include a plurality of alternative power settings.

Example 19 includes the subject matter of any one of examples 17-18, where the alternative power setting corresponds to implementation of the physical layer in a multi-chip package.

Example 20 includes the subject matter of any one of examples 17-19, where alternating current (AC) coupling is to be used in the standard power setting and direct current (DC) coupling is to be used in the alternative power setting.

Example 21 includes the subject matter of any one of examples 12-20, where the physical layer device includes a PHY integrated circuit (IC) device.

Example 22 includes the subject matter of any one of examples 12-21, where the physical layer device includes a microcell.

Example 23 includes the subject matter of any one of examples 12-22, where a set of parameters are to be implemented by the physical layer device in association with the particular power control setting, and the set of parameters include one or more of a transmitter swing parameter, a receiver equalization parameter, a clock recovery parameter, and a link training state machine parameter.

Example 24 is a system including: media access control (MAC) circuitry; and physical layer (PHY) circuitry discrete from the MAC, including a physical coding sublayer, where the PHY circuitry is configured to alternatively support at least two different power control settings, where the MAC circuitry couples with the PHY circuitry through a defined interface including a set of data pins, a set of command pins, a set of status pins, and a plurality of power control pins, where the plurality of power control pins are to indicate a particular one of the at least two power control settings to be implemented on by the PHY circuitry.

Example 25 includes the subject matter of example 24, further including a multi-chip package device including the MAC circuitry and the PHY circuitry, where the PHY circuitry is to provide an interconnect for devices internal to the multi-chip package device.

Example 26 includes the subject matter of example 25, where the PHY circuitry is to further provide a port to connect to devices external to the multi-chip package device over a link.

Example 27 includes the subject matter of example 26, where the PHY circuitry is to implement a physical layer of the link according to a particular interconnect protocol.

Example 28 includes the subject matter of example 27, where the MAC circuitry includes: state machine logic to implement a link training and status state machine of the particular interconnect protocol; and circuitry to generate signals according to the particular interconnect protocol.

Example 29 includes the subject matter of example 28, where the particular interconnect protocol includes one of a protocol based on PCIe, USB, SATA, Display Port, Thunderbolt, or Converged IO.

Example 30 includes the subject matter of any one of examples 24-29, where the MAC circuitry includes further includes a power setting detector to determine that the particular power setting is to be applied and cause the particular power setting to be indicated at the power control pins of the interface.

Example 31 includes the subject matter of any one of examples 24-30, where the at least two power control settings include a standard power control setting and an alternative power setting.

Example 32 includes the subject matter of example 31, where the alternative power setting includes a power setting associated with channels with short physical lengths.

Example 33 includes the subject matter of any one of examples 31-32, where the at least two power control settings include a plurality of alternative power settings.

Example 34 includes the subject matter of any one of examples 31-33, where the alternative power setting corresponds to implementation of the physical layer in a multi-chip package.

Example 35 includes the subject matter of any one of examples 31-34, where alternating current (AC) coupling is to be used in the standard power setting and direct current (DC) coupling is to be used in the alternative power setting.

Example 36 includes the subject matter of any one of examples 24-35, further including a PHY integrated circuit (IC) device to include the PHY circuitry.

Example 37 includes the subject matter of any one of examples 24-36, further including a microcell to include the PHY circuitry.

Example 38 includes the subject matter of any one of examples 24-37, where a set of parameters are to be implemented by the physical layer device in association with the particular power control setting, and the set of parameters include one or more of a transmitter swing parameter, a receiver equalization parameter, a clock recovery parameter, and a link training state machine parameter.

Example 39 includes the subject matter of any one of examples 24-38, where the interface includes a PHY Interface for the PCI Express (PIPE)-based interface.

Example 40 includes the subject matter of any one of examples 24-39, further including a first chip and a second chip, where the first chip includes the PHY circuitry and the MAC circuitry, and the PHY circuitry is to implement a link between the first chip and the second chip.

Example 41 includes the subject matter of example 40, where the first chip and second chip are on a common package.

Example 42 is a method including: identifying, at a defined interface of a physical layer (PHY) device, a power control signal, where: the interface includes a set of data pins, a set of command pins, a set of status pins, and a plurality of power control pins; the power control signal is received on the plurality of power control pins; and the interface couples the PHY device to a media access control (MAC) circuitry; selecting a particular one of a plurality of power control setting supported by the PHY device based on a value of the power control signal; and implementing a physical layer of a link according to parameters associated with the particular power control setting.

Example 43 includes the subject matter of example 42, further including communicating data with another device over the link.

Example 44 includes the subject matter of example 43, where the PHY device and the MAC circuitry are on a first device, and the first device and the other device are on a common package.

Example 45 includes the subject matter of example 44, where the first device includes a first die, the other device includes a second die, and the link couples the first die to the second die.

Example 46 includes the subject matter of any one of examples 42-45, where the interface includes a PHY Interface for the PCI Express (PIPE)-based interface.

Example 47 includes the subject matter of any one of examples 42-46, where the link is according to a particular interconnect protocol.

Example 48 includes the subject matter of example 47, where the particular interconnect protocol includes one of a protocol based on PCIe, USB, SATA, Display Port, Thunderbolt, or Converged IO.

Example 49 is a system including means to perform the method of any one of examples 42-48.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
physical layer (PHY) circuitry configured to alternatively support a plurality of different power control settings, wherein the plurality of different power control settings comprises a first power control setting for normal operation and a second power control setting for short-reach channel applications;
a PHY Interface for the PCI Express (PIPE)-based interface to couple the PHY circuitry to a media access control (MAC) layer, wherein the PIPE-based interface comprises a plurality of pins, a power control signal is to be received from the MAC layer at the PHY circuitry on a subset of the plurality of pins, and the power control signal identifies a selection of one of the plurality of different power control settings to apply during operation;
wherein the PHY circuitry is to apply parameters of the selected one of the plurality of different power control settings based on the power control signal, the first power control setting comprises use of alternating current (AC)-coupling by the PHY circuitry on the interconnect, and the second power control setting comprises use of direct current (DC)-coupling by the PHY circuitry on the interconnect.

2. The apparatus of claim 1, wherein the PIPE-based interface further comprises a data interface, a command interface, and a status interface.

3. The apparatus of claim 2, wherein the data interface is implemented by a set of data pins in the plurality of pins, the command interface is implemented by a set of command pins in the plurality of pins, and the status interface is implemented by a set of status pins in the plurality of pins.

4. The apparatus of claim 1, wherein the PHY circuitry comprises a physical coding sublayer.

5. The apparatus of claim 1, wherein the parameters comprise a channel loss parameter.

6. The apparatus of claim 1, wherein the parameters of the first power control setting comprise a first receiver equalization parameter and the parameters of the second power control setting comprises a different second receiver equalization parameter.

7. The apparatus of claim 1, wherein the parameters of the first power control setting comprise use of a receiver detect state defined in a state machine, and the parameters of the second power control setting comprise bypass of the receiver detect state.

8. The apparatus of claim 1, wherein the power control signal comprises a code, wherein the code comprises a two-bit code, a first value of the code is to indicate that the first power control setting is to be applied by the PHY circuitry, and a second value of the code is to indicate that the second power control setting is to be applied by the PHY circuitry.

9. The apparatus of claim 1, wherein the subset of the plurality of pins comprises two or more pins.

10. The apparatus of claim 1, wherein the parameters comprise, for each of the plurality of power control settings, a respective receiver equalization parameter and a respective channel loss parameter.

11. The apparatus of claim 1, wherein the second power control setting corresponds to implementation of the physical layer associated with a die-to-die link in a multi-chip package.

12. The apparatus of claim 1, further comprising a PHY integrated circuit (IC) device comprising the PHY circuitry and the interface, wherein the PHY IC device is discrete from the MAC layer.

13. The apparatus of claim 1, further comprising a microcell comprising the PHY circuitry and the interface.

14. An apparatus comprising:

a media access control (MAC) layer block;

a PHY Interface for the PCI Express (PIPE)-based interface to couple to a physical layer device, wherein the PIPE-based interface comprises a plurality of power control pins to carry a code to indicate to the physical layer device a particular one of at least two power control settings to be implemented on the physical layer device, wherein the MAC layer block comprises circuitry to generate the code at the power control pins to indicate the particular power control setting to the physical layer device and the particular power control setting comprises settings for a short-reach link, wherein the at least two power control settings have different respective parameters to apply at the physical layer device, and the parameters of the particular power control setting comprise use of direct current (DC)-coupling at the PHY circuitry instead of alternating current (AC)-coupling.

15. The apparatus of claim 14, wherein the MAC layer block comprises circuitry to generate signals according to a particular interconnect protocol.

16. The apparatus of claim 15, wherein the MAC layer block further comprises state machine logic to implement a link training and status state machine of the particular interconnect protocol, and a receiver detect state of the link training and status state machine is to be bypassed in accordance with the particular power control setting.

17. The apparatus of claim 15, wherein the particular interconnect protocol comprises one of a protocol based on PCIe, USB, SATA, Display Port, or Converged IO.

18. A system comprising:

a first die on a package; and a second die on the package, wherein the first die is coupled to the second die on the package by an interconnect, and the second die comprises a port to couple to the interconnect, and the port comprises:

media access control (MAC) circuitry; and physical layer (PHY) circuitry discrete from the MAC circuitry, wherein the PHY circuitry is configured to alternatively support a plurality of different operational power control settings, wherein the plurality of different operational power control settings comprises a first power control setting for normal operation and a second power control setting for short-reach channel applications, wherein the MAC circuitry couples with the PHY circuitry through a PHY Interface for the PCI Express (PIPE)-based interface comprising a data interface, a command interface, and a status interface, wherein the PIPE-based interface comprises a plurality of power control pins to carry a signal from the MAC circuitry to the PHY circuitry to indicate a particular one of the plurality of operational power control settings to be implemented by the PHY circuitry during communication of data over the data interface, wherein the first power control setting comprises use of alternating current (AC)-coupling by the PHY circuitry on the interconnect, and the second power control setting comprises use of direct current (DC)-coupling by the PHY circuitry on the interconnect.

19. The system of claim 18, wherein the parameters of the first power control setting comprise use of a receiver detect state defined in a state machine, and the parameters of the second power control setting comprise bypass of the receiver detect state.

20. The system of claim 19, wherein the receiver detect state is to be bypassed to proceed directly to a polling state in the state machine based on the parameters of the second power control setting.

21. The system of claim 18, wherein the PHY circuitry is to implement a physical layer of the link according to a particular interconnect protocol, wherein at least some of the particular operational power control settings are to be applied to the physical layer of the link.

22. The apparatus of claim 1, wherein the power control signal is defined as a unidirectional signal oriented from the MAC layer to the PHY circuitry.

* * * * *